J. B. Heald,
Saw Collar.
No. 109,898.
Patented Dec. 6, 1870.

Witnesses:
G. Wadleigh
C. P. Rossiter

Inventor:
James B. Heald

United States Patent Office.

JAMES B. HEALD, OF MILFORD, NEW HAMPSHIRE.

Letters Patent No. 109,898, dated December 6, 1870.

IMPROVEMENT IN COLLARS FOR CIRCULAR SAWS.

The Schedule referred to in these Letters Patent and making part of the same.

*To all whom it may concern:*

Be it known that I, JAMES B. HEALD, of Milford, in the county of Hillsborough, and State of New Hampshire, have invented certain new and useful Improvements in Collars for Circular Saws; and I do hereby declare the following to be a full, clear, and exact description of the same, reference being had to the accompanying drawing which forms a part of this specification, in which—

Figure 1:
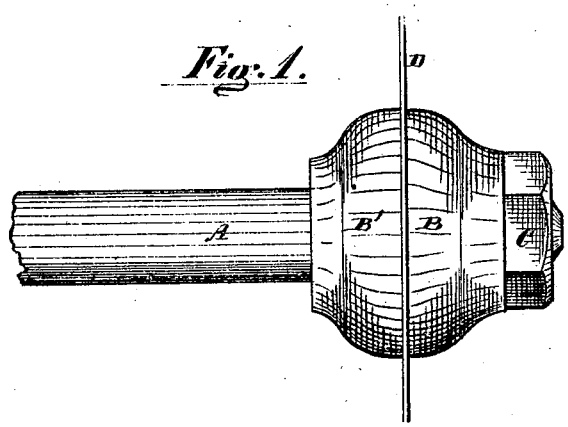
Figure 1 represents a side view of my improved saw-collar.

To enable those skilled in the art to which my invention belongs to make and use the same, I will proceed to describe it more in detail.

The nature of my invention consists in an improved collar for circular saws, provided with a peculiarly constructed centering device, to facilitate the adjustment of different saws upon the arbor, as hereinafter explained.

In the drawing, the parts marked A represent the arbor;

B B' indicate the halves of the collar;

C indicates the holding-nut; and

D, the saw.

The arbor A is turned off at the end to form a shoulder, $a$, against which the back of the inside half B', of the collar rests, as indicated in the drawing.

Figure 2:
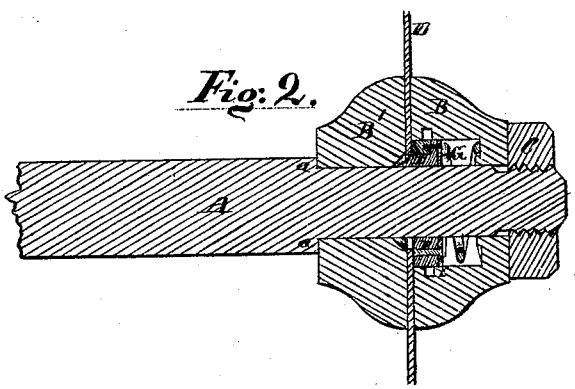
Figure 2 represents a central longitudinal section of the arbor and collar.
Figure 3:
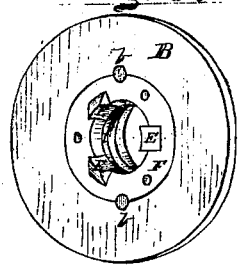
Figure 3 represents a perspective view of the interior part of the outside half of the collar.

The outer half, B, of the collar is formed hollow, and in its interior is arranged a series of steel points, E, supported in a movable inside collar or ring, F, from which their ends project, said ends being beveled off, as indicated in figs. 2 and 3.

A thin steel washer, I, is riveted to the back side of the ring F, to support the points E in position, and still allow them to spring slightly inward with any pressure upon their outer beveled ends, so that they will press closely down upon the arbor A when in use.

A coiled spring, G, is arranged within the opening, at the rear of the ring F, which presses said ring out even with the face of the collar B, while pins $b$ are set at the sides of the opening, on which the ring F can slide back and forth, and by means of which it is retained within the opening, and also prevented from turning around.

The saw D is arranged upon the arbor A, between the two parts of the collar B B'.

The bevel points E enter the eye of the saw, and should the eye be of greater diameter than the arbor, the saw will be properly centered and supported by the beveled points E.

As the nut C is screwed on, the two parts of the collar B and B' clamp and hold the saw.

The points E and ring F recede into the opening, so that the former project only just far enough to retain the saw at its proper center.

By the use of my improvement, saws with different sizes of eye can be quickly attached to the arbor, since the yielding points E always cause them to fit in a central position; and again, in case of the arbor, becoming heated, the saw will not be sprung or warped, as it would if the eye of the saw fitted closely on the arbor, or was filled with a solid bushing or continuous centering ring.

Having described my improvements in collars for circular saws,

What I claim therein as new and of my invention, and desire to secure by Letters Patent, is—

The combination with the collar B, ring F, and points E, of the steel washer I, and spring G, substantially as and for the purposes set forth.

JAMES B. HEALD.

Witnesses:
G. WADLEIGH,
C. P. ROSSITER.